United States Patent [19]

Lindahl

[11] Patent Number: 4,533,148

[45] Date of Patent: Aug. 6, 1985

[54] SEALING RING ASSEMBLY FOR USE IN PULP REFINING EQUIPMENT

[76] Inventor: LeMoyne Lindahl, Rte. 2, Box 3340, Clatskanie, Oreg. 97018

[21] Appl. No.: 657,620

[22] Filed: Oct. 4, 1984

[51] Int. Cl.³ .............................................. F16J 15/48
[52] U.S. Cl. ..................................................... 277/53
[58] Field of Search ..................................... 277/53–57

[56] References Cited

U.S. PATENT DOCUMENTS

| | | | |
|---|---|---|---|
| 3,219,282 | 11/1965 | Horstman . | |
| 3,273,809 | 9/1966 | Horstman . | |
| 3,685,747 | 8/1972 | Horstman . | |
| 3,746,270 | 7/1973 | Moore, Sr. . | |
| 3,843,065 | 10/1974 | Horstman et al. . | |
| 3,948,449 | 4/1976 | Logan et al. . | |
| 4,027,721 | 6/1977 | Gentry | 277/54 |
| 4,221,343 | 9/1980 | Skeen . | |
| 4,304,409 | 12/1981 | Orlowski | 277/53 |
| 4,330,133 | 5/1982 | Palfreyman et al. | 277/54 |
| 4,458,957 | 7/1984 | Greener | 277/53 |

Primary Examiner—Robert I. Smith
Attorney, Agent, or Firm—Kolisch, Hartwell & Dickinson

[57] ABSTRACT

A sealing ring assembly for use in a pulp refiner unit which includes a housing having a pair of counter-rotating discs and a stock feed inlet mounted to the housing adjacent an opening provided therein for directing raw material toward the discs includes a seal ring defined by a circular flange section detachably mounted on the stock feed inlet within the housing opening and a projecting ring section extending from the flange section toward the discs. The sealing ring assembly also includes an inlet ring defined by a flange section detachably mounted on the disc most adjacent the housing opening and a projecting ring section extending from the flange section toward the housing opening for concentrically receiving the seal ring's projecting ring section thereby defining an annular clearance region between the projecting ring sections.

4 Claims, 2 Drawing Figures

SEALING RING ASSEMBLY FOR USE IN PULP REFINING EQUIPMENT

BACKGROUND AND SUMMARY OF THE INVENTION

The present invention relates to pulp refining equipment, and more particularly to a sealing ring construction for use in pulp refiner units which utilize counter-rotating discs. The present invention is directed to a novel pair of rings which are mounted on the pulp refiner unit, internally thereof, to substantially ensure flow of material to the grinding interface between the discs.

Pulp refiner units of the "double disc" type are machines which include a pair of counter-rotating discs mounted within a housing for receiving raw material, such as fibrous wood particles or solids to grind the solids into fibers or "pulp" for use in manufacturing paper, paperboard and engineered wood products such as particleboard, waferboard, etc. The housing includes an opening in front of which is mounted a stock feed inlet for channeling the raw material toward a first or feed disc which includes a plurality of passageways for directing the material to the interface between the discs. However, a problem resides in providing an efficient seal between the passageways provided in the feed disc and the opening in the casing. Stated differently, it is undesirable to have raw material be drawn from the stock feed inlet through the opening to bypass the passageways in the feed disc so as to be misdirected into the space between the discs and the housing. If that occurs, the raw material will not be pulped. Various proposals have been made for providing some type of sealing ring construction on disc refiners.

An example is the construction set forth in Horstman, U.S. Pat. No. 3,273,809. In that patent, a sealing ring construction is disclosed in which a first seal ring is mounted on the housing or casing so as to concentrically receive therewithin an inlet ring which is mounted on the feed disc. The inlet ring extends radially inwardly of the opening and therefore receives material directly against its external vertical face during rotation of the feed disc. Moreover, the gap or annular region presented between the outside surface of the inlet ring and the inside surface of the seal ring is open to the stock inlet, thereby presenting a direct route whereby raw material may be transferred into the space between the housing and the discs, thereby bypassing the passageways in the feed disc. While it is possible to adjust the gap between the seal and inlet rings, obviously some clearance must be provided for operation inasmuch as the rings are relatively movable. In addition, there must be provided some gap between the face of the inlet ring and the adjacent surface of the stock feed inlet so that contact does not occur. This all means that there is a means by which raw material may be directed to bypass flow to the passageways in the feed disc.

Moreover, another disadvantage results from the construction shown in Horstman, inasmuch as raw material drawn into the annular region between the seal and inlet rings sweeps over the upper shoulder of the chute of the stock feed inlet, which deleteriously abrades that surface. As mentioned previously, action of the raw material being drawn into the passageways of the feed disc will also tend to wear down the surface of the inlet ring, all of which means that the useful life of the inlet ring and stock feed inlet is short and expensive.

Other proposals have been made to provide sealing ring constructions for disc refiners units, one of which is Horstman, et al., U.S. Pat. No. 3,843,065. There, a sealing ring construction is modified so that a labyrinth passage is provided in which fluid under pressure creates what is referred to as a "dynamic dam" to block and prevent unrefined raw material from being directed between the seal and inlet rings. However, in order to provide such a construction, specially formed seal and inlet rings must be formed, and it is still problematical to replace the rings when they become worn.

Because of the attendant disadvantages in the prior art with respect to sealing ring constructions for pulp refiner units, it is a general object of the present invention to provide a sealing ring assembly which includes a seal ring defined by a circular flange section from which extends a projective ring section. The flange section is detachably mounted on the stock feed inlet within the housing and the projecting ring extends toward the discs. An inlet ring is defined by a flange section from which extends a projecting ring section. The flange section is detachably mounted on the disc closest to the stock feed inlet, and the projecting ring extends from the flange section toward the housing opening for concentrically receiving the seal ring's projective ring section. This construction results in an annular clearance region defined between the projecting ring sections which is in a reverse direction from the flow path of raw material being drawn into the passageways of the feed disc.

It is another object of the present invention to provide a sealing ring assembly, as defined above, in which the annular clearance region is conical in form. That construction permits ready clearance adjustment between the seal and inlet rings, merely by providing a single adjustment, as opposed to at least two adjustments on prior art sealing ring constructions. That feature of the present invention will be more fully described at a later point herein.

Still another object of the present invention is to provide a sealing ring assembly, as defined above, in which the seal ring, and a particular portion of its flange section, is dimensioned to extend below the opening in the stock feed inlet. Inasmuch as the inlet ring is concentrically mounted to surround the projecting ring section of the seal ring, material does not directly engage the inlet ring, which rotates with the feed disc, thereby resulting in a significant diminution in wear on the inlet ring. Because the seal ring is stationary, it may receive impact of the raw material, as it is being drawn through the stock feed inlet into the passageways of the feed disc, without the degree of abrading wear which would result on a rotating ring.

Yet a further object of the present invention is to provide a sealing ring assembly, as described above, in which the projecting ring section of the seal ring has a inwardly tapered, conical outer surface and the projecting ring section of the inlet ring has an outwardly tapering conical inner surface. By so constructing the opposed outer and inner surfaces of the seal and inlet rings, respectively, trouble-free operation is ensured, and adjusting the gap of the annular clearance region between the projecting ring sections is readily made.

These and additional objects and advantages of the present invention will be more readily understood after a consideration of the drawings and the following detailed description of the preferred embodiment.

DETAILED DESCRIPTION OF THE PREFERRED EMBODIMENT

Figure 1:
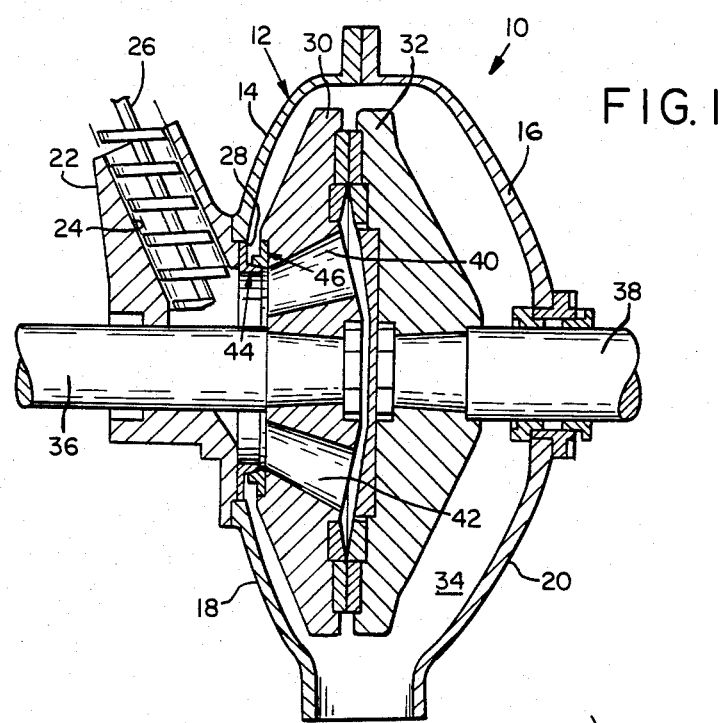
FIG. 1 is a side-elevational view, taken in cross section, of a portion of a disc refiner unit showing mounting of the sealing ring assembly of the present invention.

As stated at the outset, it is a general object of the present invention to provide a sealing ring assembly on a pulp refiner unit (disc refiner unit) which greatly diminishes the wear experienced on conventional sealing rings, and which enables rapid and accurate adjustment of the clearance region between the rings. It is desired to provide a seal ring assembly which may be adapted readily to existing disc refiner units as a retrofit. In order to set the stage, attention is directed initially to FIG. 1 which illustrates, in a cross-sectional side-elevation view, relevant components of a conventional disc refiner unit generally indicated at 10. The unit includes a housing, generally indicated at 12, defined by detachable casing sections such as indicated at 14, 16 18 and 20. At a forward end of housing 12 there is provided another housing such as a stock feed inlet 22 having a shoulder 22a, and a bore or chute 24 for transferring raw material, such as chips, by an auger 26. The raw material is transferred through a center bore or opening 28 for refining.

Mounted within housing 12 are a pair of counter-rotating discs, such as a first or feed disc 30 and a second control end disc 32. Extending through opening 28 is an elongate drive shaft 36, rotatably driven by power source (not shown) for imparting rotation, in a first direction, to feed disc 30. While not shown specifically in FIG. 1, it is to be understood that drive shaft 36 is suitably disposed within bearings, at an outboard bearing end, adjustable for selectively positioning feed disc 30 relative to stock feed inlet 22 disc 32. Shown to the right of FIG. 1 is a second drive shaft 38, rotatably driven opposite to that of drive shaft 36 by a power source (not shown) for imparting counter-rotation to disc 32.

It will also be noted that a plurality of passageways, such as indicated at 40, 42 are provided in feed disc 30. The passageways direct raw material from chute 24 and opening 28 into the interface between the discs, so that the material may be subjected to refining or pulping action. After the grinding has taken place, the pulp is ejected into enclosure 34 in housing 12, and transferred by a means not shown into the next step in the process.

It will be noted in FIG. 1 that a seal ring, in accordance with the present invention, generally indicated at 44, is mounted on stock inlet 22 and casing 12 for orientation with opening 28. An inlet ring, according to the present invention, generally indicated at 46 is mounted on feed disc 30. An enlarged view of the seal and inlet rings and their mounting is presented in FIG. 2, and attention is now directed there for a more detailed description of the seal and inlet rings of the present invention, which comprise a novel sealing ring assembly.

Figure 2:
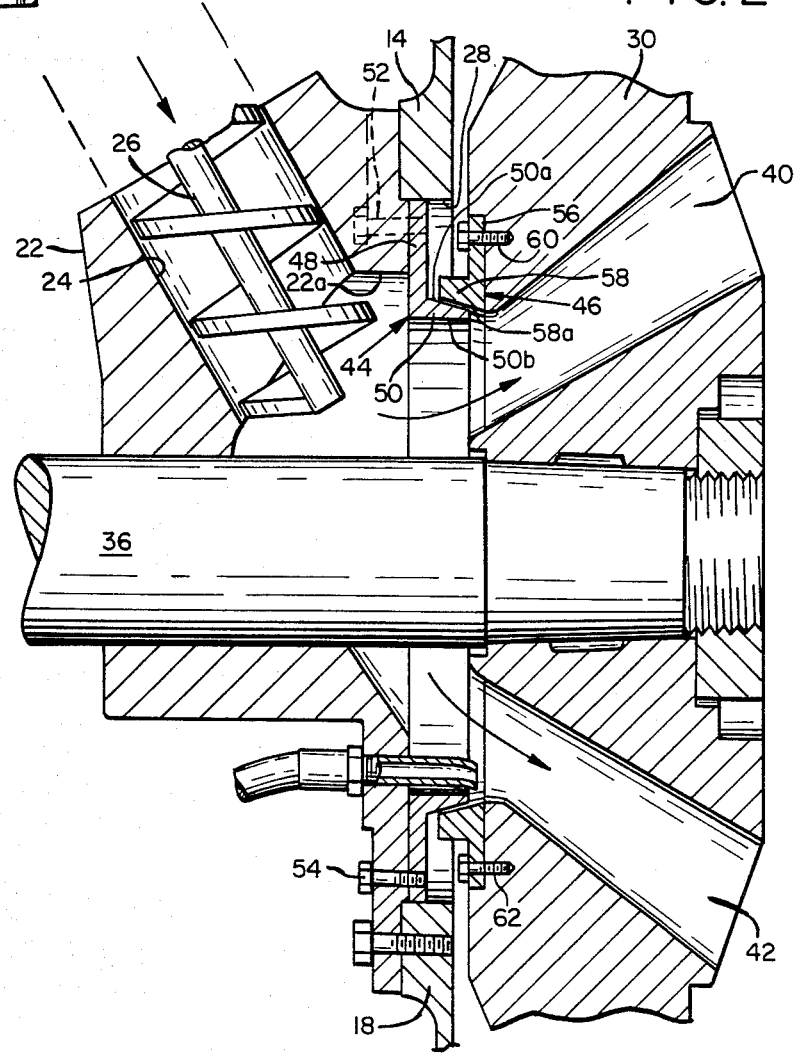
FIG. 2 is an enlarged view of a portion of a disc refiner unit, showing in greater detail arrangement of the sealing ring assembly of the present invention.

Specifically, as shown in FIG. 2, seal ring 44 is defined by a circular flange section 48 and a projecting ring section 50 integrally formed therewith. Seal ring 44 is made in two semicircular halves, which are positioned within opening 28, which is circular, for mating along a parting line, to define an assembled circular seal ring. It will be noted that flange section 48 is detachably mounted on stock feed inlet 22 by means of bolts, one of which is indicated above shaft 36 at 52, and another below the shaft at 54. Flange section 48 is dimensioned with a width so that it extends beneath shoulder 22a of stock feed inlet 22. Projecting ring section 50 extends from flange section 48 toward the discs, and is defined by a beveled or inwardly tapering outer surface 50a. The outer surface thereby is conical in form, and is opposed to an outwardly tapering conical form of inlet ring 46 which will be described. It will also be noted that the inner surface of projecting ring section 50 is cylindrical, such as indicated at 50b.

Inlet ring 46 is also defined by a circular flange section 56 and a projecting ring section 58. Flange section 56 is detachably mounted on disc 30 by means of bolts, such as indicated at 60, 62, and projecting ring section 58 extends from its associated flange section toward opening 28, and partially thereinto, for concentrically receiving projecting ring section 50 of seal ring 44. Projecting ring section 58 is defined by an inner surface 58a which outwardly tapers generally at the same angularity (10° to 30°, preferably 15°) as outer surface 50a of projecting ring section 50. Thus, an annular clearance region is defined between the projecting ring sections, i.e. between projecting ring sections 50, 58. The annular clearance region is not directly within the path of raw material which is directed by means of auger 26 through opening 28 and drawn into passageways 40, 42 because of centrifugal forces generated by the rotation of feed disc 30. Rather, material will be swept through the opening defined by inner surface 50b of seal ring 44 and be directed through the passageways in a manner to bypass the annular clearance region between surfaces 50a, 58a.

As a matter of fact, the raw material would have to reverse its direction of travel to migrate into the annular clearance region defined between surfaces 50a, 58a. Inasmuch as the material is being drawn into passageways, 42, 50, such a reversal is highly unlikely. The advantage to the seal and inlet ring construction of the present invention in that the "gap" or clearance region is oriented away from material flow. Without significant passage of raw material into the annular clearance region, abrasive wear between the seal and inlet rings is significantly reduced.

Conical outer surface 50a of projecting ring section 50 and conical inner surface 58a of projecting ring section 58 not only defines an annular clearance region which effectively limits migration of raw material into enclosure 34, but also enables ready adjustment of that clearance region. To best appreciate that advantageous aspect of the present invention, a description of replacement and adjustment of conventional sealing rings, such as that disclosed in Horstman (U.S. Pat. No. 3,273,809) and Horstman, et. al., (U.S. Pat. No. 3,843,065) will be set forth. First of all, in those constructions, it is necessary to remove the upper housing cover or case to expose the bolts which secure the seal ring in position. The bolts along the top half of the seal ring are removed, which enables the top half of the seal ring to be pulled off. The bolts holding the bottom half of the seal ring are then removed, and it is necessary to "tap" the bottom half of the seal ring round into the upper position, i.e. above the drive shaft, so that it may be removed.

In order to obtain access to the inlet ring, it is necessary to remove the upper half of the inlet feed spout. The bolts screwing the inlet ring to the feed disc are then removed so that the upper half of that ring may be pulled off. The feed disc is then rotated to position the bottom half of the inlet ring in an upper position so that the bolts holding it to the feed disc can be removed, enabling the remaining half of the inlet ring to be lifted off. In installation, a reversed procedure is necessary in order to mount the component sections or halves of the seal and inlet rings. Then, it is necessary to use a feeler gauge to set two clearances, both of which must be made.

The first clearance is between the wall of the inlet feed spout and the exterior surface of the inlet ring. In order to set that clearance, it is necessary to adjust the outboard bearing adjustment bolts to shift the drive shaft and the feed disc toward or away from the inlet feed spout. A feeler gauge is then placed between the wall surface of the feed spout and the inlet ring to set the proper clearance. With respect to the clearance between the inner surface of the seal ring and the outer periphery of the inlet ring, it is necessary to shim between the seal ring and the casing. The shims are placed between the inlet feed spout and the seal ring. Effecting that type of clearance adjustment is a difficult and time consuming chore.

In contrast, removal and replacement of the seal and inlet rings of the present invention and relative adjustment to provide a desired annular clearance region is a relatively simple matter. With respect to removal of the rings, the following steps are required (with reference to FIGS. 1 and 2):

(1) Casing section 12 is removed;

(2) The adjustment bolts of the outboard bearing feed end are loosened and shaft 36 is shifted toward the right;

(3) All of the bolts are removed from inlet ring 46, the upper half of the ring is removed and disc 30 is rotated so that the remainder half may be removed; and (4) All of the bolts, such as indicated at 52, 54, etc. securing seal ring 44 are removed, the upper half of that ring is lifted away, the bottom half is "tapped" around and removed.

In order to remount new seal and inlet rings, a reverse procedure is followed. Most importantly, however, is the ease in which only a single required clearance adjustment between seal ring 44 and inlet ring 46 can be made. It is necessary only to adjust the outboard bearing feed end to check the clearance between outer surface 50a and inner surface 58a of seal and inlet rings 44, 46, respectively. Thus, only one adjustment, as opposed to two adjustments on conventional sealing ring constructions is required. Moreover, it is not necessary to remove the inlet feed spout to make the necessary adjustment. It should be appreciated that the sealing ring assembly of the present invention provides very important advantages from removal, reinstallation and clearance setting procedures.

In addition, because seal ring 44 is affixed to inlet feed spout 22 with flange section 48 extending beneath shoulder 22a, raw material will not tend to wear down that shoulder because it is directed through opening 28 via the cylindrical passageway defined by cylindrical inner surface 50b. It has been found that wear on the face of the inlet feed spout is eliminated because seal ring 44 is stationary with respect to the flow of raw material. Moreover, wear on seal ring 44 itself is also substantially eliminated. Inlet ring 46, which rotates with feed disc 30 is minimally exposed to the raw material, and the clearance between projecting ring sections 50, 58 is in a direction reverse to the passage of raw material flow through passageways 40, 42. This is in direct contrast to the constructions shown in Horstman (U.S. Pat. No. 3,273,809) and Horstman, et al., (U.S. Pat. No. 3,843,065).

Also to be noted is the relative angularity of the taper of bevels of the conical surfaces of the projecting ring sections, which is preferably within the range of 10° to 30°. As such, the reverse angularity defined by the annular clearance region between the seal and inlet rings will be oriented to substantially prevent inflow of raw material.

While the present invention has been shown and described with reference to the foregoing preferred embodiment, it will be apparent to those skilled in the art that other changes in form and detail may be made therein without departing from the spirit and scope of the invention as defined in appended claims.

It is claimed and desired to secure by Letters Patent:

1. A sealing ring assembly for use in a pulp refiner unit including a housing which includes a pair of counter-rotating discs and a stock feed inlet mounted to the housing adjacent an opening provided therein for directing raw material toward the discs, comprising:

a seal ring defined by a circular flange section detachably mounted on the stock feed inlet within the housing opening and a projecting ring section extending from the flange section toward the discs; and an inlet ring also defined by a flange section detachably mounted on the disc most adjacent the housing opening and a projecting ring section extending from the flange section toward the housing opening for concentrically receiving the seal ring's projecting ring section thereby defining an annular clearance region between the projecting ring sections.

2. The sealing ring assembly of claim 1 wherein the annular clearance region is conical in form.

3. The sealing ring assembly of claim 1 wherein the seal ring's flange section is dimensioned to extend below the opening of the stock feed inlet.

4. The sealing ring assembly of claim 1 wherein the seal ring's projecting ring has a conical outer surface and the inlet ring's projecting ring has a conical inner surface, the two surfaces being positioned relative to one another to define an annular clearance region which is in a direction substantially reverse to the flow of raw material toward the discs.

* * * * *